April 21, 1970
L. R. SMITH ET AL
3,507,046
MICROMETER WITH INDICATING LIGHT
Filed June 18, 1968
2 Sheets-Sheet 1
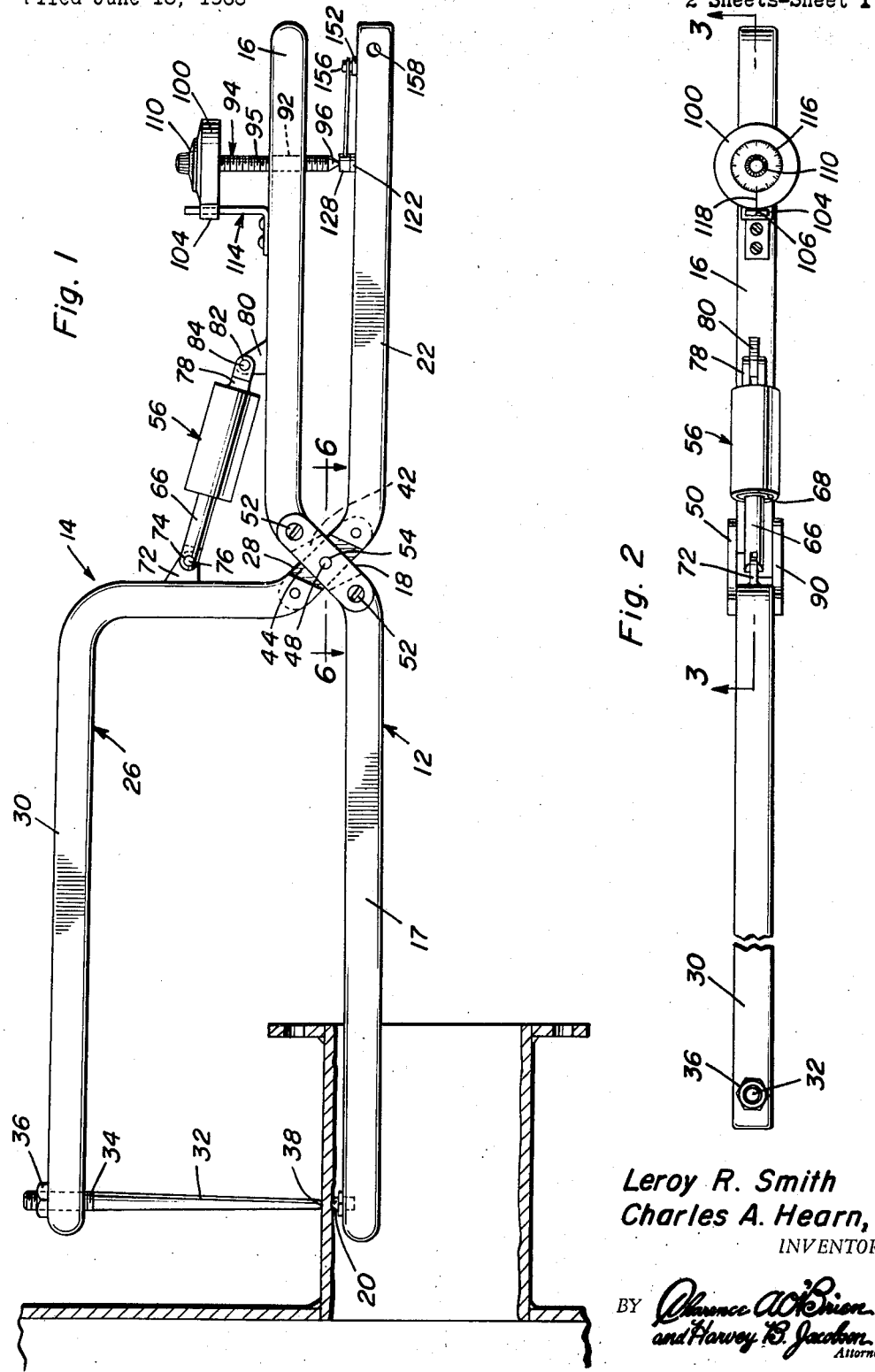
Leroy R. Smith
Charles A. Hearn, Sr.
INVENTORS.

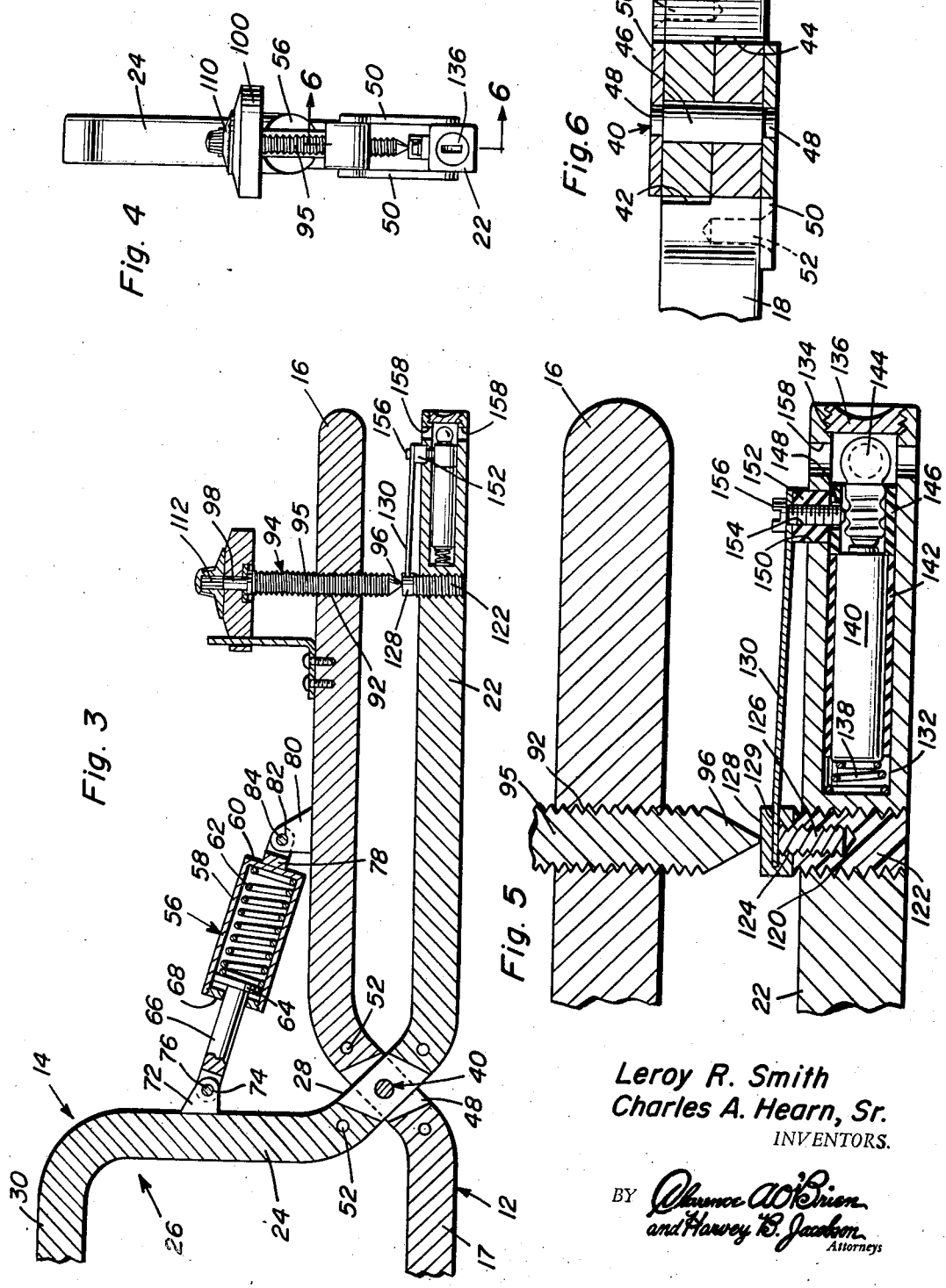

United States Patent Office
3,507,046
Patented Apr. 21, 1970

3,507,046
MICROMETER WITH INDICATING LIGHT
Leroy R. Smith, Freeport, and Charles A. Hearn, Sr., Clute, Tex. (both c/o 510 S. Ave. A, Freeport, Tex. 77541)
Filed June 18, 1968, Ser. No. 738,063
Int. Cl. G01b 3/16
U.S. Cl. 33—149
3 Claims

ABSTRACT OF THE DISCLOSURE

A micrometer with one straight leg and one offset leg with each leg having a small ball type measuring point thereon. The particular contour of the legs along with the measuring points thereon permits measuring of the thickness of hitherto inaccessible areas of vessels and tubes, as well as the measurement of thickness of material left in such areas due to pitting or corrosion. The establishment of the thickness of material being measured closes a circuit in the micrometer which lights a bulb to indicate the exact point of measurement has been reached.

---

The instant invention relates to a micrometer that can measure hard to reach areas on metal containers, nozzle necks, etc. The micrometer has one substantially straight leg and one offset leg with the ends of each leg provided with a small ball type point to engage the surface to be measured. The offset leg and the straight leg combined with the surface engaging points on the legs permit a versatility of measurement and inspection not heretofore available. The points may be placed in the velley of a pitted or corroded area and thereby measure the thinnest or weakest section of the material on the piece to be measured. Also, one of the legs of the micrometer being straight, it can be inserted into narrow inside diameter tubes or nozzles that have flanges on the end thereof. Heretofore, micrometers which are used for the purpose herein intended have had uniform mirror image leg structures which prevent their being inserted into narrow openings whether or not there is a flange on the end thereof.

It is therefore an object of this invention to provide a simple but unique thickness measuring device.

It is a further object of this invention to provide a micrometer able to measure wall thickness of narrow diameter tubing, nozzles and vessels.

It is a still further object of this invention to provide a micrometer with a light to indicate when an exact measurement has been made.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side view of the subject invention in use to measure the ball thickness of a neck with a flange on the end thereof.

FIGURE 2 is a top plan view of the subject invention.

FIGURE 3 is a sectional view, on an enlarged scale, taken substantially along the line 3—3 of FIGURE 2.

FIGURE 4 is an end view of the device looking at the handles thereof.

FIGURE 5 is an enlarged sectional view taken substantially along the line 5—5 of FIGURE 4.

FIGURE 6 is an enlarged sectional view taken substantially along the line 6—6 of FIGURE 1.

Referring now to the drawing, the micrometer is generally indicated by the numeral 10 and is composed of two main components, a lower substantially straight lever 12 and an upper offset lever 14, each having flat parallel sides thereon. The lower lever 12 has a handle portion 16 and a jaw portion 17 connected thereto by the angled connecting portion 18, with the jaw 17 and the handle 16 being generally parallel. A small diameter ball 20 is attached at the end of jaw 17 remote from the handle to engage one surface of an article to be measured. The ball may be attached to the jaw in any suitable fashion, such as by an integral threaded shaft attached thereto to be received in the leg, as shown in FIGURE 1. The diameter of the ball 20 is of a size small enough to be placed into pits or corroded areas on an object to be measured.

The upper offset lever 14 has a handle portion 22 attached to the base leg 24 of an L-shaped jaw 26 by offset portion 28. The free leg 30 of jaw 26 extends generally perpendicular to base leg 24 and parallel to handle portion 22. A tapered pin 32 is attached to the end of free leg 30 remote from the handle to engage one surface of an article to be measured. The pin 32 has a threaded end 34 received through a threaded opening in leg 30 with a locknut 36 to fix the pin relative to the leg once it has been set. The pin 32 terminates in a small ball point 38 that is of a diameter that will permit it to be placed into pits or corroded areas on the object to be measured.

The lower and upper levers, 12 and 14 respectively, cross one another and are pivoted about hinge pin 40 passing through their angled connecting portions 18 and 28, respectively. The portions 18 and 28 are cut away from half the thickness of the lever on the sides of the levers that will be juxtaposed, as indicated at 42 and 44 respectively. These cutaway portions, 42 and 44, allow the sides of the levers to be coplanar when the levers are juxtaposed on the hinge pin 40. The hinge pin 40 has a large diameter center section 46 which is the same length as the two juxtaposed cutaway sections of the levels, see FIGURE 6, with a reduced diameter section 48, 48 at each end thereof which extends beyond the coplanar surface of the levers. Plates 50, 50 extend across the cutaway portions 42 and 44 and are fastened at each end to the levers by a screw 52. A hole 54 is at the center of each plate 50 and fits onto section 48 of pin 40 and abuts against enlarged portion 46 thereof, to retain the pin therein.

The two levers thus pivoted together in a crossed relation have the two ball point units 20 and 38 in opposed abutting relation when the jaws, 17 and 30 respectively, are closed. A resilient device 56 is provided to urge the jaws closed and the ball points into engagement with the device to be measured. The resilient device 56 comprises a cylinder 58 with one end 60 closed and a spring 62 contained therein. A piston 64 and rod 66 are inserted in the open end of the cylinder and the opening therein closed by end section 68 with adequate space being provided for preventing air lock. The rod 66 extends through the end section 68 and has a clevis end 70 thereon which aligns with an abutment 72, with hole 74 therethrough, on the base leg 24 of jaw 26. A pin 76 extends through the clevis and abutment thereby pivotally securing them together. A rod 78 with a clevis end is fixed to the closed end 60 of the cylinder to align with an abutment 80, with a hole 82 therethrough, mounted on handle 16 of lever 12. A pin 84 extends through the clevis end and the abutment and thereby pivotally secures them together.

A measuring and indicating assembly 90 is mounted on the ends of the handles 16 and 22 remote from the jaws thereof. Threaded bore 92 extends through handle 16 and receives a threaded end 95 of shaft 94 therethrough which has a pointed end 96. The shaft 94 narrows to a smooth portion 98 above handle 16 with a knurled end thereon at the end remote from the point. Disk 100 with opening 102 therethrough fits over and rotatably receives shaft 98 through the opening 102. The disk 100 has a main cylindrical portion with a lug 104 on the circumference thereof and a rectangular shaped opening 106 therethrough. Washer 108 is interposed between the top of the threaded portion 95 of shaft 94 and the disk 100 to provide an anti-friction wear surface therefor. Dial 110 with knurled opening 112 therein, is secured on the knurled end of shaft 94 and fixed thereto by the engagement of the knurled surfaces of the dial and shaft. An L-shaped bracket 114 is fixed by its base leg to the handle 16 near the opening 92 therein so that the free end of the bracket extends parallel to shaft 94 and is received in opening 106 in the lug 104 of disk 100. Disk 100 is thus prevented from rotating with shaft 94 and dial 110, but is free to move up and down in the bracket as the shaft is rotated. Dial 110 has the customary graduated scale 116 around the circumference to register with a reference line 118 on the disk 100 so that the opening between ball points 20 and 38 can be translated into a measure of units.

An indicating light portion of assembly 90 is mounted on handle 22 adjacent the measuring device on handle 16. A threaded bore 120 through handle 22 is axially aligned with the bore 92 and receives therein a threaded plug 122, formed of a nonconductive material such as Plexiglas. The plug 122 has a threaded counterbore 124 therein which receives a threaded plug 126 which is made of a conductive material such as brass. The brass plug 126 extends above the upper surface of plug 122 and receives thereon a brass cap 128 which abuts and locks against the top surface of plug 122, and has a slight taper on its top surface with the angled surface facing the jaws so that the shaft 94 will always be perpendicular thereto. The cap 128 has a hole 129 therein which receives a conductive wire 130, whose function will be hereinafter set forth. A bore 132 extending axially into the handle 16 has a threaded opening 134 to receive a closure plug 136 therein. A coil spring 138 is placed in the bottom of bore 132 with a dry cell battery 140 and non-metallic liner 142 therearound received on top of the spring. The liner 142 firmly mounts the dry cell 140 within the bore 132 and insulates it therefrom while the coil spring 138 biases the battery into position and provides electrical contact with the handle 22.

Bulb 144 is mounted in a non-metallic liner 146 which fits into the bore 132 so that the tip of the dry cell 140 contacts the bottom contact of the bulb. The liner 146 has a hole 148 therethrough exposing a portion of the threads of the bulb 144.

A hole 150 extends from the top surface of handle 22 and opens into bore 132, adjacent the bulb liner 146 and its hole 148, with a non-metallic plug 152 fixed therein which has a threaded counterbore 154 therethrough. A conductive screw 156 has the wire 130 wrapped therearound and is inserted into the counterbore until it passes through hole 148 and engages the threads of bulb 144 thereby securing the bulb in position and completing the circuit to light the bulb. Four radially spaced holes 158 extend from the surface of the four sides of handle 22 and open into the bore 132 surrounding the bulb 144 so that the bulb can be seen regardless of the orientation of the device to the user.

In operation the jaws of the micrometer are opened and slipped onto an article to be measured. The resilient device 56 urges the jaws closed and hence the ball points 28 and 38 into contact with opposite surfaces of an article to be measured. The dial 110 is then turned moving the shaft 94 toward engagement with cap 128. When the point 96 on shaft 94 engages the cap the circuit from the battery through the handles and thence to the bulb is complete and the bulb will light up signalling that the dial reads the measure between the ball points. This is illustrated in FIGURE 1, where the micrometer is shown measuring the thickness of a tube which has an enlarged flange on the end thereof. Since the article engaging portions of the device, ball point 20 and tapered pin 32, are threadedly mounted on the lower and upper jaws, respectively, they may be replaced with article engaging portions more suited to any specific job that may arise. In addition to the above use, the instant device is also suited to situations where rapid or assembly line type of checking of thickness of tubing, vessels, etc. is required. To be so utilized, the dial 110 can be set at the minimum acceptable thickness for an article, and then for each article to be checked the jaws of the micrometer are opened and put on the article. When the jaws are released the resilient device 56 will close the jaws onto the article, and if the light comes on, the article is then known to be less than the minimum thickness that has been set on the dial. Thus can be seen the versatility of the micrometer set forth herein for all types of measuring jobs.

The foregoing is considered as illustrative only of the principles of the invention. Further, since numerous modifications and changes will readily occur to those skilled in the art, it is not desired to limit the invention to the exact constructon and operation shown and described.

What is claimed as new is as follows:

1. A measuring device comprising a pair of elongated levers oriented in crossed relation and being pivotally interconnected by a hing pin at their point of intersection, the portions of the levers on one side of the point of intersection defining jaw portions and the portions of the levers on the other side of the point of intersection defining handle portions by which the measuring device may be manually manipulated, said jaw portions of the levers being in spaced parallel relation to each other and said handle portions of the levers being in spaced parallel relation to each other with the jaw portions being spaced apart a substantially greater distance than the handle portions to enable the jaw portions to be inserted into inaccessible areas for measuring the thickness of an item, each of said jaw portions having a work-engaging member thereon for engagement with opposed surfaces of work disposed therebetween, spring means interconnecting said levers for biasing said levers in a direction for urging the jaw portions towards each other, and an indicating assembly extending between the handle portions for indicating the spatial relation between the members on the jaw portions engaging the surfaces of the work, said indicating assembly including a threaded member threaded through one of said handle portions and adapted to engage the other of the handle portions, a disk rotatably and non-linearly movably mounted on the threaded member, means interconnecting the disk and handle portion in which the threaded member is mounted for preventing rotation of the disk while permitting movement of the threaded member therein, and an index line on the disk, and a graduated dial rigid with said threaded member and assocated with the index line on the disk to indicate the number of rotations or portions thereof of the threaded member necessary to engage it with the other handle portion.

2. The structure defined in claim 1 wherein said other handle portion includes a conductive abutment for engaging the end of the threaded member, a battery operated light having one portion of an electrical circuit for energizing the light conductively connected with the abutment, said abutment being insulated from the handle portion, each of said levers and the threaded member being of conductive material and electrically connected to the light whereby contact between the threaded member and the conductive abutment will complete the circuit to the light for illuminating the light and indicating the position of the means on the jaw portions engaging the work.

3. The structure as defined in claim 2 wherein said other handle portion includes an insert of insulating material, said abutment being mounted in said insulating material for electrically insulating the abutment from the other handle portion.

References Cited

UNITED STATES PATENTS

| | | | |
|---|---|---|---|
| 611,391 | 9/1898 | Pike. | |
| 1,816,464 | 7/1931 | Biggert. | |
| 1,903,716 | 4/1933 | Kalle | 33—148 |
| 2,724,185 | 11/1955 | Harr | 33—143 |

SAMUEL S. MATTHEWS, Primary Examiner